United States Patent [19]
Weber

[11] 4,319,134
[45] Mar. 9, 1982

[54] OPTICAL ENCODER
[75] Inventor: Otto K. Weber, Chatsworth, Calif.
[73] Assignee: Sensor Technology, Inc., Chatsworth, Calif.
[21] Appl. No.: 142,345
[22] Filed: Apr. 21, 1980

Related U.S. Application Data

[62] Division of Ser. No. 916,226, Jun. 16, 1978, Pat. No. 4,224,514.

[51] Int. Cl.$^3$ .............................................. G01D 5/34
[52] U.S. Cl. ................................ 250/231 SE; 250/239
[58] Field of Search ............. 250/231 SE, 237 G, 239; 356/395; 345/347 P

[56] References Cited

U.S. PATENT DOCUMENTS 4,268,747 5/1981 Becchi et al. ................. 250/231 SE

*Primary Examiner*—David C. Nelms
*Assistant Examiner*—Darwin R. Hostetter
*Attorney, Agent, or Firm*—Spensley, Horn, Jubas & Lubitz

[57] ABSTRACT

An optical encoder for producing an electrical signal representative of the angular position and velocity of a rotatable shaft. A flexible code disk, which is coupled to the shaft via a hub portion, has a plurality of slots located adjacent its outer rim, for alternately blocking and permitting transmission of a light beam to each of a plurality of separate photocells, as the disk is rotated. The rim of the disc is disposed in a special low-friction seat, whereby the slots are maintained in proper alignment with the photocells, even though the shaft may have a slight angular misalignment relative to the encoder. The photocells are formed on a common silicon substrate that has a single diffusion layer, and the electrical outputs of separate photocells are connected in a push-pull circuit arrangement. This produces an electrical signal whose successive zero crossings are an accurate representation of the angular position of the rotatable shaft, regardless of variations in the intensity of the light beam or irregularities in the transducing sensitivities of the photocells. Additionally, the encoder has a control loop that includes a separate photocell segment formed on the same common silicon substrate, for regulating the intensity of the light beam so as to produce a constant peak voltage level for the electrical signal output.

5 Claims, 8 Drawing Figures

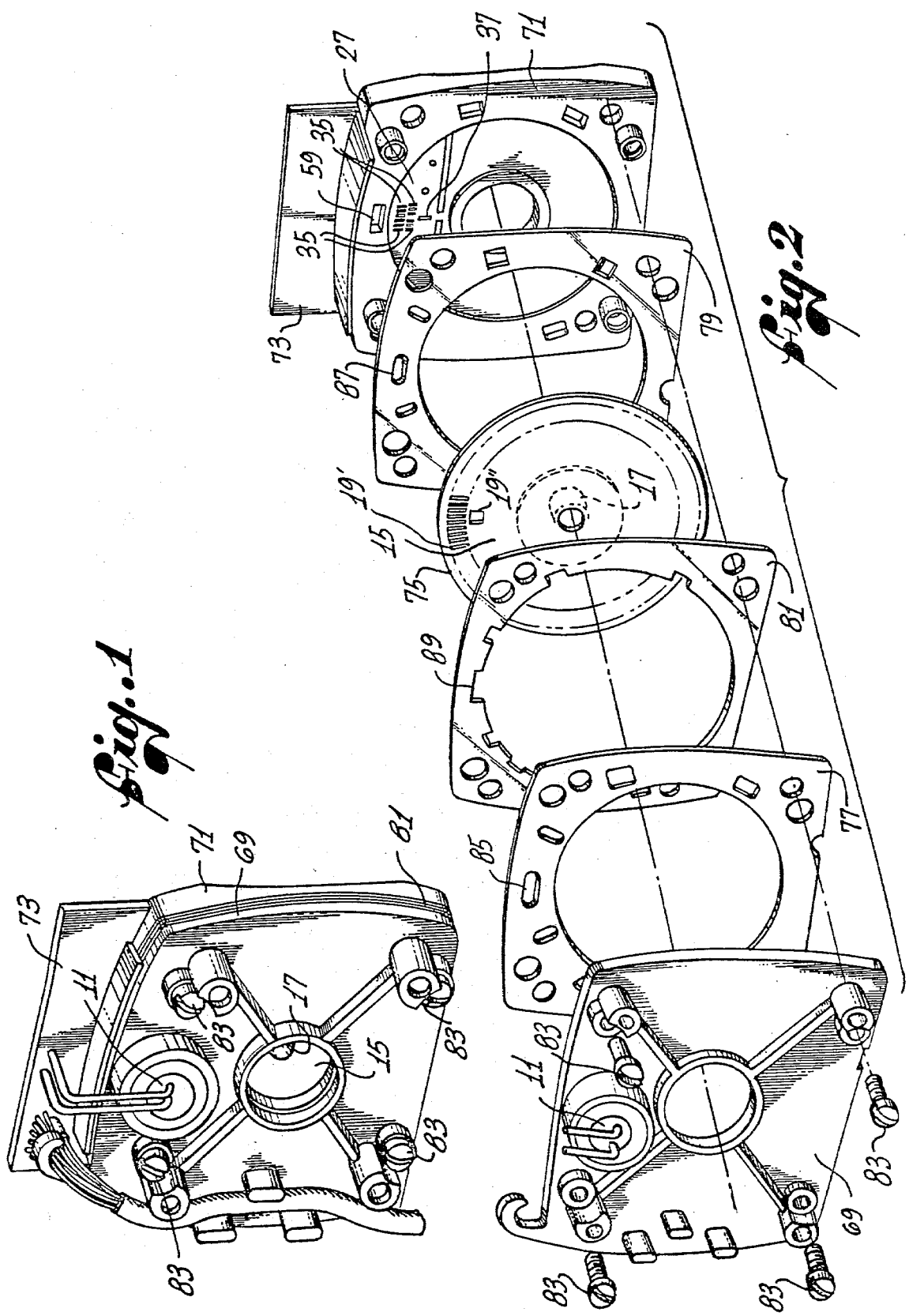

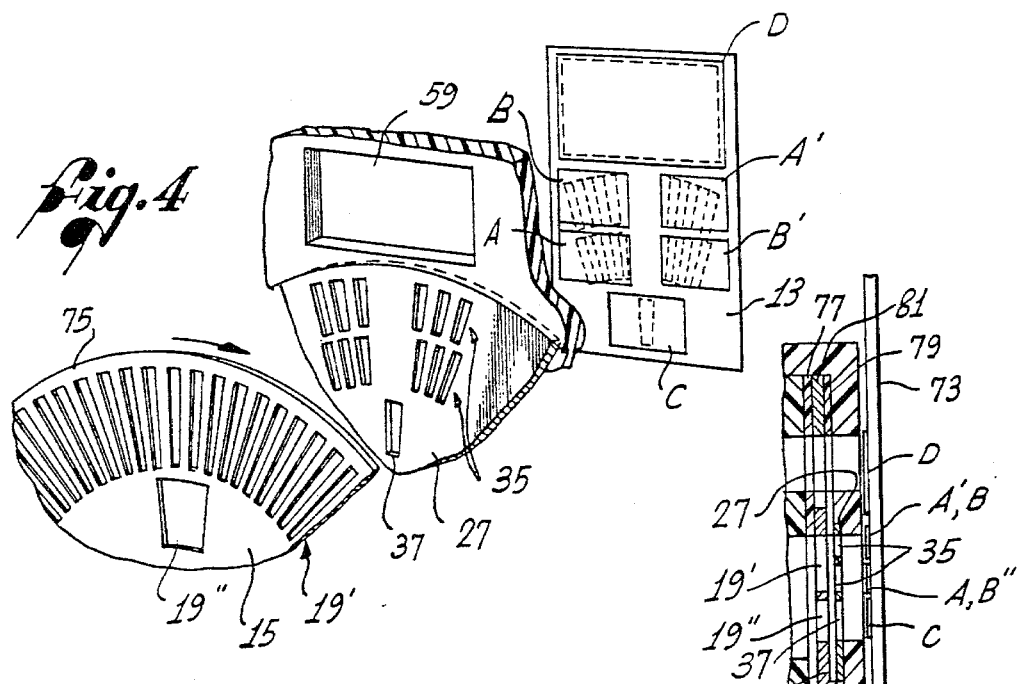
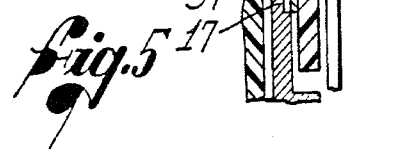
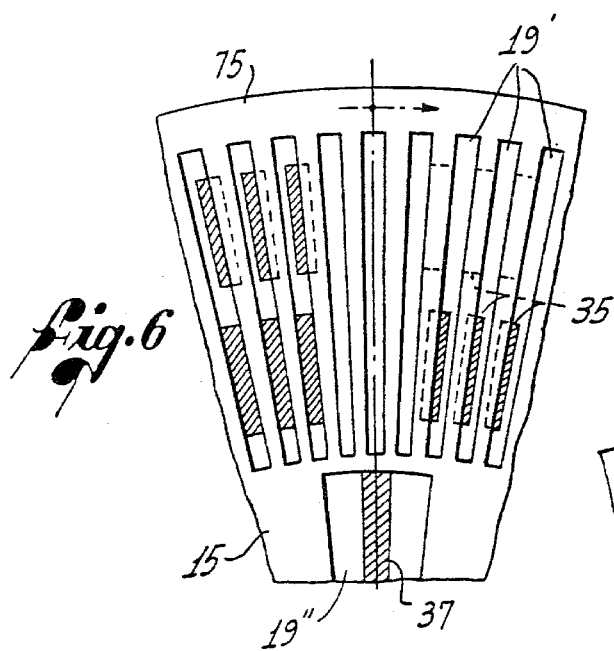
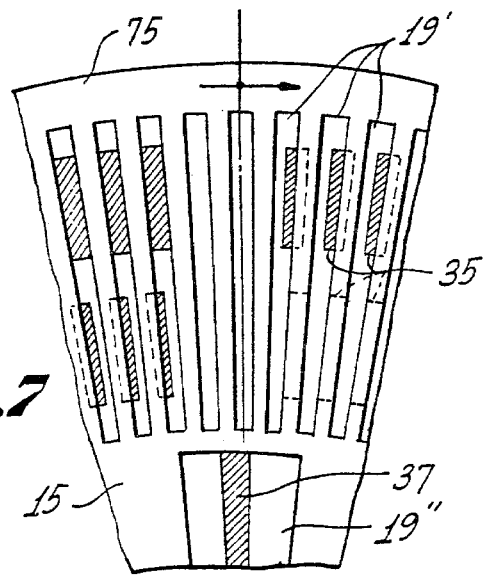

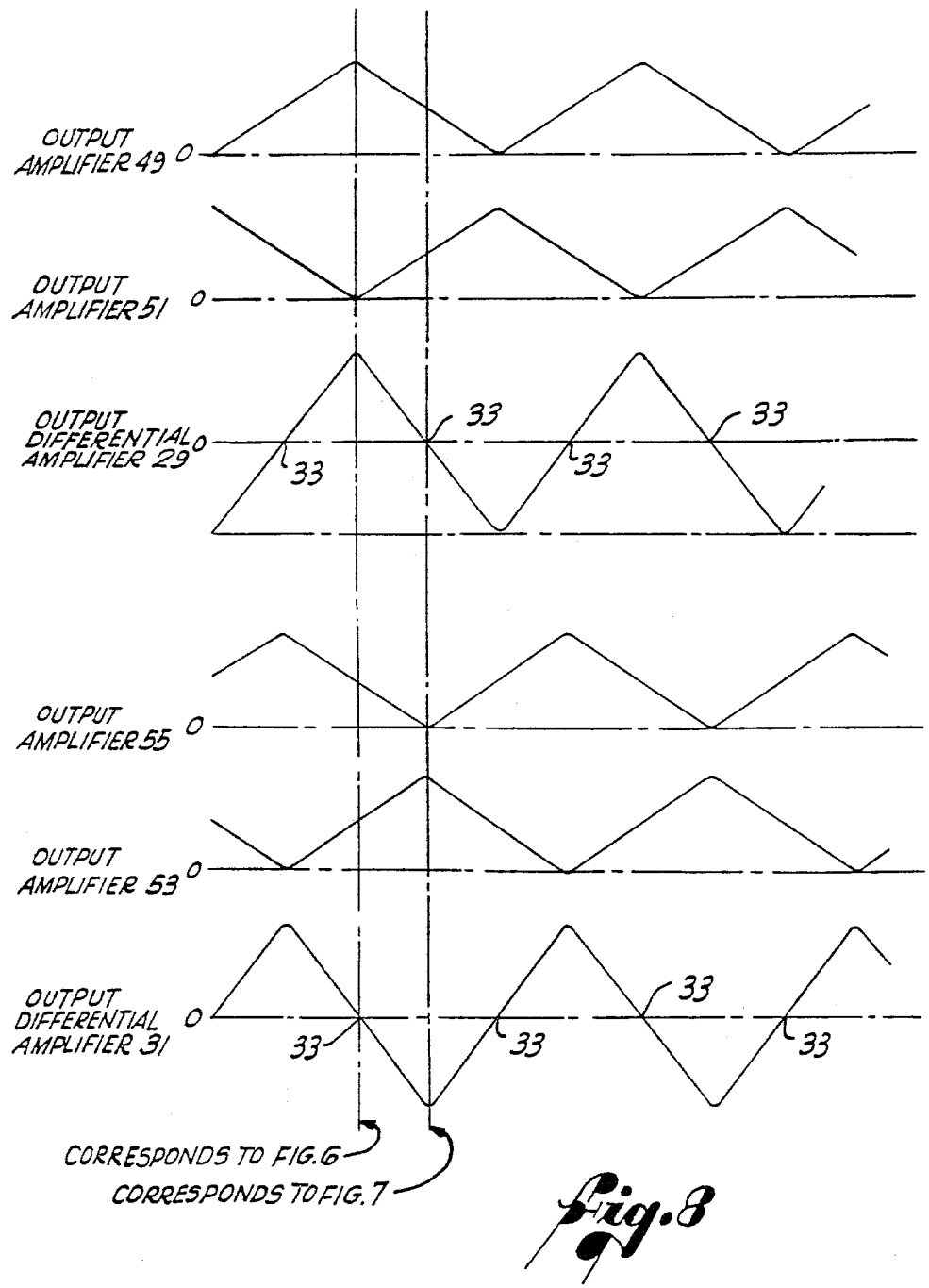

OPTICAL ENCODER

RELATED APPLICATION

This is a division of the inventor's U.S. patent application Ser. No. 916,226 filed June 16, 1978 and assigned to the same assignee as that case, now U.S. Pat. No. 4,224,514.

BACKGROUND OF THE INVENTION

This invention relates generally to optical encoders and, more particularly, to improvements in optical encoders of the type having means coupled to a movable shaft for interrupting light from impinging on a phototransducer in a predetermined fashion as the shaft is moved.

Optical encoders are typically employed to detect the angular position and velocity of a rotating shaft, and can be used, for example, in servos for controlling position and velocity of carriages and print wheels in printers. A code disk, which is typically formed of glass or etched metal, is coupled to the shaft of a motor driving such a carriage or print wheel. The disk contains a plurality of slots arranged in a predetermined circumferential pattern, and it rotates freely within an encoder housing to alternately block and permit the transmission of a light beam onto the phototransducer.

Typically, the code disk includes two annular tracks, one track having a uniform distribution of slots and the other track having a single slot indicative of an index or "home" position. Separate photocells are used for each track, and a sinusoidal signal is produced from one track and a pulse signal is produced for the other.

By monitoring the occurrence of pulses in the pulse signal and the number of cycles occurring in the sinusoidal signal, an accurate determination of the angular position of the motor shaft can be made. Additionally, by detecting the frequency or, alternatively, the peak slope of the sinusoidal signal, the angular velocity of the motor shaft can be determined. These two signals can thus be utilized by servo apparatus to control both the velocity and position of the motor shaft.

When the sinusoidal signal is used in a servo, it is important that its phase angle be accurately ascertainable. This is facilitated by utilizing a pair of complementary photocells adapted to receive light in an alternating fashion and to produce electrical signals of opposing polarities. By adding these two signals, a sinusoidal signal that is symmetric about a precise zero voltage reference can be produced.

Some shaft encoders available prior to the present invention have included means for producing two sinusoidal signals, with one signal leading or lagging the other by 90°, depending on the direction of rotation of the shaft. Appropriately incrementing or decrementing an up/down counter can then produce a continuous indication of the angular position of the shaft, regardless of the direction of its rotation.

A major drawback to the shaft encoders of the aforedescribed type arises from the need for a plurality of separate photocells or separately diffused cells on a common substrate. In either case, excessive size and unnecessary complication and expense are necessarily incurred. Additionally, the timing accuracy of the zero-crossings in the sinusoidal signal is susceptible to any imbalance in the sensitivity of the separate photocells, and maintenance of a constant peak voltage level in the sinusoidal signal cannot be easily achieved.

Another drawback to the aforedescribed shaft encoders arises from the use of relatively bulky and costly trimming potentiometers ordinarily used to balance the voltage outputs of the separate photocells. Still another drawback arises from the extreme criticality of the alignment of the code disk. Any slight misalignment of the hub of the disk relative to the array of photocells can result in substantial phase errors in the sinusoidal signal produced by the encoder.

It will be appreciated from the foregoing that there is still a need for an optical shaft encoder that can produce a signal whose phase angle is an accurate representation of the angular position of a rotatable shaft, without involving undue size, complexity, or cost and without the need for a precise physical alignment of the code disk. The present invention fulfills this need.

SUMMARY OF THE INVENTION

This invention resides in an improved optical encoder of the type having means coupled to a movable shaft for alternately blocking and permitting the transmission of a light beam onto each of a plurality of phototransducers as the shaft is moved. The encoder is operable to produce an oscillatory signal having a phase angle indicative of the position of the shaft relative to the encoder. The oscillatory signal is produced by amplifying electrical currents developed by two phototransducers that are illuminated by the light in an alternating fashion as the shaft is moved.

In accordance with the invention, the phototransducers are separate segments of a common silicon chip that can include a single diffusion layer. Currents produced by the separate photocell segments are amplified separately and then combined in a push-pull fashion in a differential amplifier, to produce an oscillatory output signal that is symmetric about a precise reference level of zero volts. In this manner, the successive zero crossings of the signal are an accurate indication of the relative position of the shaft, and the slope of the signal is an accurate indication of the velocity of the shaft. Accordingly, the signal can be utilized effectively in a precision servo apparatus.

By utilizing a silicon chip having a single diffusion layer, the separate photocell segments can be formed by using, for example, either a conventional mesa construction or a conventional planar construction, and can have substantially similar transducing sensitivities. Additionally, the separate photocells can be spaced closely together, thereby insuring that they receive light of substantially equal intensity and thereby permitting use of a light source having a relatively narrow beam angle.

The invention is of particular use in an encoder that produces a signal representative of the angular position and velocity of a rotatable shaft. Such an encoder preferably includes a code disk that is coupled to the shaft and has a code track with a plurality of circumferentially aligned slots adjacent its outer perimeter. Rotation of the disc, then, alternately blocks and permits transmission of the light beam to each of the separate photocell segments.

The code disc can also include a second code track having a single slot, for permitting the transmission of the light beam to another photocell segment, one time during each rotation of the disk. The output of this photocell segment can be utilized to produce a pulse signal output representative of an index or home position for the shaft. Preferably, the photocell segment is etched from the same common silicon chip as the other photocell segments.

In accordance with another aspect of the present invention, the peak positive and negative voltage excursions of the output signal are adjusted or trimmed following assembly of the encoder using a laser trimming technique. A thick film resistor, which is used in the feedback loop of a separate operational amplifier for amplifying the current developed by each photocell segment, is suitably trimmed to increase its resistance, thereby permitting adjustment of the peak voltage produced to a predetermined level. By this technique, the use of relatively expensive trimming potentiometers is obviated, and the adjustment can be performed in a quick and accurate manner.

The shaft encoder of the present invention can further include a second pair of photocell segments for producing a second oscillatory output signal, which has a phase angle that lags or leads that of the first output signal by 90°, depending on the direction of rotation of the code disk. These photocells are preferably formed from the same common silicon chip as are the other cells, and receive light through the same arrangement of code disc slots. This second signal can be produced using the same push-pull circuit technique as the first signal. The quadrature phasing can be produced by appropriately staggering the second pair of photocell segments relative to the first pair, or by appropriately sizing a mask disposed in front of the photocell segments.

In accordance with a further aspect of the present invention, the encoder includes still another photocell segment, which is etched from the same silicon chip, and which is used in a feedback control system to maintain a constant peak voltage level for the two oscillatory signal outputs and the pulse signal output. This is accomplished by arranging this photocell segment to receive light from beyond the outer perimeter of the code disk, whereby it can continuously receive and sense the intensity of the light beam. The feedback control system then operates to regulate the current supplied to the light source, preferably a light emitting diode (LED), to achieve a stable light intensity. Since the silicon chip utilized by this feedback control loop is also used to produce the two oscillatory outputs and the pulse output, their transducing sensitivities should be reasonably closely matched and variations in the efficiency of the LED should affect all of the photocell segments substantially equally.

In an alternative embodiment of the present invention, the slots and the separate photocell segments (or masks over such photocells) can be appropriately sized to expose equal amounts of the silicon chip for all angular positions of the disk. In this manner, a summation of the signals produced by such photocells can be utilized effectively to regulate the current supplied to the light source, resulting in a more compact photocell arrangement and permitting use of a light source having a narrower beam angle.

In accordance with still another aspect of the present invention, the disk is formed of a flexible sheet material that is rotatable in an encoder housing, in a seat formed by special guide means. The guide means preferably includes two guide sheets formed of a low-friction material and disposed on opposite sides of a spacer that surrounds the code disk, whereby the guide sheets are adapted to slidably abut the rim of the disk, i.e., the region between the outer perimeter thereof and the slots. If there is any slight angular misalignment of the hub of the disk relative to the housing, the disc can flex to maintain the disk rim in its proper seat, with the disk slots in proper alignment with the photocells.

Many other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

In the accompanying drawings:

FIG. 1 is a perspective view of an optical shaft encoder embodying the present invention;

FIG. 2 is an exploded perspective view of the encoder of FIG. 1;

FIG. 4 is a fragmentary exploded view of the apparatus of FIG. 1, showing the path of the light through the code disk and the sensor mask and onto the array of photocells;

FIG. 5 is a sectional view of a portion of the apparatus of FIG. 1, showing the alignment of the slots in the code disk, the guide sheets, and the sensor mask;

FIG. 6 is a plan view of a portion of the code disk disposed over the sensor mask, one photocell segment in the pair of photocells A—A' being shown as fully illuminated, and both photocell segments in the pair of photocells B—B' being shown as partially illuminated;

FIG. 7 is a plan view similar to FIG. 6, but with the code disk rotated clockwise a distance equal to one half the width of a slot, whereby both photocell segments in the pair of photocells A—A' are partially illuminated and one photocell segment in the pair of photocells B—B' is fully illuminated; and FIG. 8 is a waveform diagram showing the electrical signals produced by various amplifiers in the electrical circuitry depicted in FIG. 3.

DESCRIPTION OF THE PREFERRED EMBODIMENT

Figure 3:
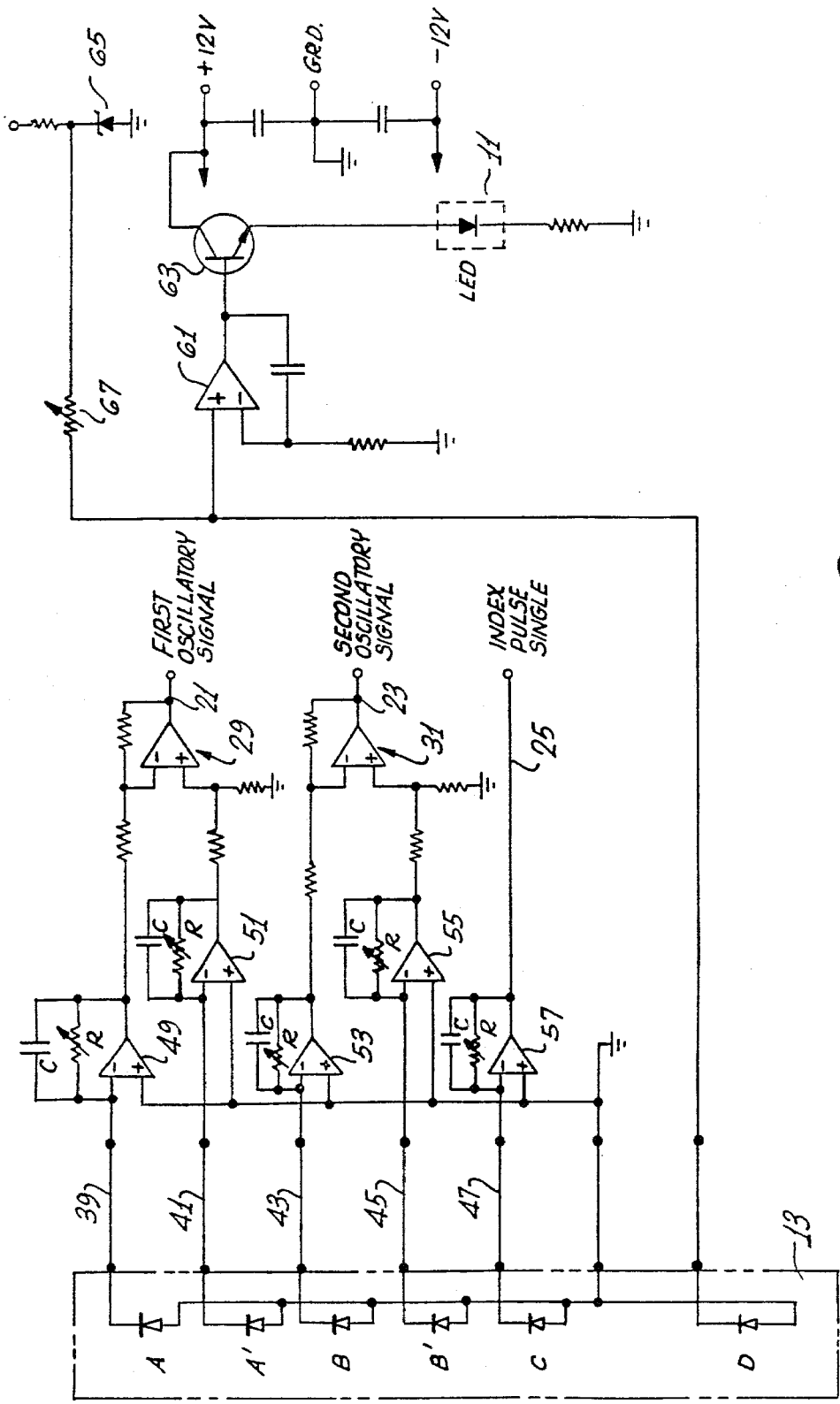
FIG. 3 is a schematic diagram of the electrical circuitry of the apparatus of FIG. 1.

Referring now to the drawings, and particularly to FIGS. 1 and 2, there is shown an optical shaft encoder constructed in accordance with the preferred embodiment of the present invention. The encoder is used with a rotatable shaft (not shown) coupled, for example, to a print wheel or carriage in a printer, and is operable to produce a number of electrical signals representative of the angular position and velocity of the shaft.

The encoder includes a source of light, preferably in the form of an LED 11, and a phototransducer array 12 adapted to receive light from the LED. The encoder further includes a code disk 15, which has a hub portion 17 coupled to the rotatable shaft, and which includes a plurality of circumferentially aligned slots 19 to alternately block and permit transmission of the light to each of the various segments of the phototransducer array 13, as the disk is rotated.

The slots 19 in the code disk 15 are arranged in two circumferential tracks, an outer track containing approximately 200 slots 19' substantialy evenly distributed around the perimeter of the disk, and an inner track containing a single slot 19" representative of an index or "home" position.

Associated with the outer track of the code disk 15 are four sensor segments A, A', B, and B', each adapted to produce an electrical current proportional to the amount of light it receives. The currents produced by the segments A and A' are processed by the encoder to produce a first oscillatory signal having a phase angle representative of the angular position and velocity of the shaft. Similarly, the currents produced by the segments B and B' are processed by the encoder to produce a second oscillatory signal, which has a phase angle that lags or leads that of the first signal by 90°, depending on the direction of rotation of the shaft. The first and second oscillatory signals are output by the encoder on lines 21 and 23 (FIG. 3), respectively.

Associated with the inner track of the code disk 15 is a single sensor segment C. Electrical current produced by this segment is utilized to produce an index pulse signal, which is output by the encoder on line 25 (FIG. 3).

The phototransducer array 13 is disposed behind a sensor mask 27, which in combination with the slots 19' on the code disk 15 causes the two sensors in each pair of sensor segments, A—A' or B—B', to be illuminated in an alternating fashion. At periodic angular positions of the disk, one sensor in each such pair is fully illuminated, while the other sensor receives no light, and, as the disk is rotated, the amount of light impinging on each sensor continuously varies in a smooth fashion between zero and a peak amount.

In accordance with one aspect of the invention, the phototransducer array 13 is formed from a common silicon chip that includes a plurality of segments of a single diffusion layer. The separate sensor segments in the array can be formed by a conventional mesa process that includes a step of etching the diffusion layer. Electrical currents produced by the separate sensors in each pair of sensors A—A' and B—B' are amplified separately and then combines in a pair of differential amplifiers 29 and 31 (FIG. 3) connected in a push-pull circuit arrangement. This produces the two oscillatory signals, which are symmetric about a precise reference level of zero volts.

As a result, variations in the light intensity and non-linearities in the transducing characteristics or sensitivities of the photocells will affect the peak voltage levels in the oscillatory signals, but not the timing of their successive zero crossings 33 (FIG. 8). Accordingly, the zero crossings constitute an accurate indication of the angular position of the shaft and the signals can be used effectively in a precision servo apparatus (not shown) for control of the angular position and velocity of the shaft.

Since the separate segments in the phototransducer array 13, i.e., the two pairs of sensors A—A' and B—B' and the separate sensor segment C, are formed from a common silicon chip having a single diffusion layer, they all have substantially similar transducing sensitivities, i.e., each segment produces approximately the same electrical current upon receipt of an equal amount of light. Additionally, the separate photocell segments can be spaced closely together, thereby insuring that they receive light of substantially equal intensity and thereby permitting use of an LED 11 having a relatively narrow beam angle.

As best shown in FIG. 4, the sensor mask 27 includes a separate set of three elongated openings 35 over each of the sensor segments A, A', B and B', and a single elongated opening 37 over the sensor segment C. The spacing between the three openings 35 in each set corresponds to the spacing between the slots 19 in the code disk 15, so that as the disk is rotated, three distinct regions in each sensor segment are simultaneously illuminated in a periodic fashion.

The slots 19' and the mask openings 35 are substantially rectangular and the width of each is substantially equal to the distance between adjacent slots, so that when the code disk is rotated at a constant angular velocity, the amount of area illuminated on each of sensor segments A, A', B and B' will vary substantially linearly between a minimum area (zero) and a maximum area. As a result, each such sensor segment will produce an electrical current signal that is substantially triangular in shape (see FIG. 8), varying substantially linearly between zero and a maximum.

FIG. 6 depicts a portion of the code disk 15 disposed over the sensor mask 27, which in turn is disposed over the phototransducer array 13. The disk is depicted at an instant when three of its slots are in precise alignment with the three masks openings 35 adjacent the sensor segment A, with the portion of that sensor that is illuminated being indicated by cross hatching in the figure. Simultaneously, the three mask openings adjacent the sensor segment A' are in precise non-alignment with the disk slots, so no portion of that sensor is illuminated. As indicated by the cross hatching in the figure, the sensor segments B and B' are both partially illuminated.

Similarly, FIG. 7 depicts a portion of the code disk 15 and the sensor mask 27 after the disk has been rotated clockwise a distance equal to one half the width of a slot 19'. At this instant, the slots 19' are disposed such that half of the sensor segment A and half of the sensor segment A' are exposed, while, simultaneously, a maximum portion of segment B and no portion of segment B' are exposed.

As shown in FIG. 4, the separate segments in the two pairs of sensors A—A' and B—B' are disposed in a substantially rectangular arrangement, with the photocells in each pair being disposed on opposite corners thereof. By so arranging the photocells, any slight misalignment of the cod disc hub 17 relative to the sensor array 13 will not result in any substantial phase errors in the two oscillatory signals that are produced. This is because the misalignment will create a slight phase lag in the electrical signal produced by one photocell in each pair, and a slight phase lead in the electrical signal produced by the other photocell in the pair, whereby after the two electrical signals have been combined in the corresponding differential amplifier 29 or 31 (FIG. 3), the timing of the successive zero crossings 33 (FIG. 8) will be substantially unaffected by the misalignment.

The electrical circuitry for the encoder is depicted schematically in FIG. 3. The electrical currents developed by the various photocell segments of the sensor array 13, i.e., the two segments A and A' for producing the first oscillatory signal, the two segments B and B' for producing the second oscillatory signal, and the segment C for producing the pulse signal and transmitted over lines 39, 41, 43, 45, and 47 to operational amplifiers 49, 51, 53, 55, and 57, respectively. In a conventional manner, these amplifiers convert the corresponding electrical currents into corresponding electrical voltages. In the feedback loop of each operational amplifier is a resistor R for providing the desired signal gain, and a capacitor C for stability. The resistors R are suitably trimmed so that each amplifier produces a peak voltage corresponding to a predetermined level. The peak voltage level for each of amplifiers 49, 51, 53, and 55 is preferrably 0.50 volts, and the peak voltage level for amplifier 57 is preferrably 5.0 volts.

In accordance with one aspect of the present invention, the resistance values of the resistors R in the feedback loops of the operational amplifiers 49, 51, 53, 55, and 57 are adjusted following assembly of the encoder by means of a laser trimming technique. The resistors are preferably of a thick film type, whereby resistance levels sufficiently high to achieve the desired voltage levels can be obtained. By utilizing a laser trimming technique, the use of relatively expensive trimming potentiometers is obviated, and the adjustment can be performed in a quick and accurate manner.

The output signals of the operational amplifiers 49 and 51 are suitably combined in the differential amplifier 29, to produce the first oscillatory signal for output on line 21 by the encoder. Similarly, the output signals of amplifiers 53 and 55 are combined in the differential amplifier 31, to produce the second oscillatory signal for output on line 23 by the encoder. All of these signals are depicted in FIG. 8. The respective signal levels that result from the orientations of the code disk 15 depicted in FIGS. 6 and 7 are indicated in FIG. 8. The output of the amplifier 57 constitutes the index pulse signal for output by the encoder on line 25.

The optical shaft encoder of the present invention further includes control means for regulating the electrical current supplied to the LED 11, and thereby producing a controllable light intensity. In accordance with one aspect of the invention, the control means includes a separate photocell segment D, which is formed on the same common silicon substrate as the other photocell segments (i.e., A, A', B, B', and C), and, which is adapted to sense the intensity of the light beam produced by the LED 11.

The separate photocell segment D included in the control means is etched from the common silicon substrate and adapted to receive the light from the LED 11 at a location beyond the outer perimeter of the code disk 15, through a separate opening 59 in the sensor mask 27. Since the transmission of light to this photocell segment B cannot be interrupted by rotation of the code disk, the light intensity of the LED can be continuously regulated.

FIG. 3 illustrates electrical circuitry that is included in the LED control means. Electrical current for driving the LED 11 is produced by an operational amplifier 61 and an NPN transistor 63, which are connected in a conventional circuit arrangement. The magnitude of this electrical current is automatically adjusted by the circuit to result in a current being produced by the photocell segment D that is substantially equal to a reference current. This reference current is produced in a conventional manner using a zener diode 65 and a resistor 67. This resistor 67 preferably is of a thick film type and is trimmed to produce the desired current level by use of a laser trimming technique.

Since the photocell segment D utilized in the LED control system is formed on the same substrate as are the photocell segments earlier described (i.e., A, A', B, B', and C), their transducing sensitivities should be reasonably closely matched and variations in the efficiency of the LED 11 should affect all of the photocells substantially equally. For this reason, the control system is effective in maintaining the peak voltage levels of the two oscillatory signals and the index pulse signal at their predetermined levels.

In an alternative embodiment of the present invention, the slots 19' in the code disk 15 and the openings 35 in the sensor mask 27 can be appropriately sized to insure that an equal amount of sensor area is exposed to receive the light at all times, i.e., for all angular positions of the disk. In this manner, a summation of the electrical signals produced by the corresponding photocell segments (A, A', B, and B') can be utilized continuously as a measure of the light intensity of the LED 11, for regulation of the electrical drive current supplied thereto. This results in a more compact photocell arrangement, since there is no need for the separate photocell segment D, located beyond the perimeter of the code disk 15, and permits use of an LED 11 having a narrower beam angle.

As shown in FIGS. 2 and 5, the encoder further includes an LED housing 69 for carrying the LED 11, and a sensor housing 71 for carrying the sensor array 13 and for carrying a printed circuit board 73 on which the electrical circuitry of FIG. 3 is located. Additionally, the LED housing 69 and the sensor housing 71 serve as an enclosure for the code disk 15.

In accordance with one aspect of the invention, the disk is formed of a flexible stainless steel sheet having an outer rim portion 75 that is disposed in a seat formed within the encoder by special guide means. The guide means includes two Mylar guide sheets 77 and 79 disposed on opposite sides of a spacer 81 that surrounds the code disk 15, whereby the guide sheets are adapted to slidably abut the portion of the disc located between its outer perimeter and the slots 19. The guide sheets and the spacer are positioned between the LED housing 69 and the sensor housing 71, and the respective housings are attached to each other by means of screws 83.

Because of the flexibility of the disk 15, its rim 75 is maintained in position between the guide sheets 77 and 79, in alignment with the sensor array 13, even in the event of a slight misalignment of the hub 17 of the disk relative to the sensor housing 17. Suitable apertures 85, 87, and 89 are formed in the two guide sheets 77 and 79 and the spacer 81, respectively, to permit transmission of light from the LED 11 to the photocell segment D.

The pressure of the abutment of the guide sheets 77 and 79 with the rim 75 of the code disk 15 is low enough to permit the disk to be rotated readily therebetween, but high enough to insure that the disk will not be damaged from shock or vibration prior to attachment to the rotatable shaft.

From the foregoing description, it should be apparent that the present invention provides an effective optical shaft encoder for producing electrical signals representative of the angular position and velocity of a rotatable shaft. In particular, electrical currents developed by separate photocell segments formed on a common substrate that has a single diffusion layer are combined in a push-pull circuit arrangement. As a result, the timing of the successive zero crossings in the resultant electrical signal accurately represent the angular position of the shaft, regardless of variations in the intensity of the light received by the segments and irregularities in the transducing sensitivities of the photocells. Additionally, the peak voltage levels of the electrical signals produced by the encoder are maintained at a constant level by a control system that utilizes a photocell segment formed on the same common substrate as those utilized in producing the electrical signals. Further, the encoder includes special guide means that insures a proper alignment of a code disk coupled to the rotatable shaft and, additionally, that reduces the likelihood of damage to that code disk prior to such coupling.

While a particular form of the invention has been illustrated and described, it will be understood by one of ordinary skill in the art that various modifications can be made without departing from the spirit and scope of the invention. Accordingly, it is not intended that the invention be limited, other than by the appended claims.

I claim:

1. A method of making an optical shaft encoder of a type that produces an electrical signal having a phase angle representative of the relative position of a movable shaft, said encoder including a source of light, a photocell positioned to receive the light, means coupled to the movable shaft for blocking transmission of the light to the photocell in accordance with the relative position of the shaft, and amplifier means coupled to the photocell for producing the electrical signal, said amplifier means including variable resistance means for use in controllably adjusting the peak amplitude of the electrical signal, said method comprising the steps of:

mounting said photocell and said amplifier means on a circuit board, energizing said source of light and said amplifier means and moving said movable shaft in a prescribed fashion, monitoring the peak amplitude of the electrical signal produced by said amplifier means, and comparing it to a prescribed level, directing a laser beam onto the variable resistance means in said amplifier means, while continuing to monitor the peak amplitude of the electrical signal and to compare it to the prescribed level, said laser beam having an intensity sufficient to alter the resistance of the variable resistance means, thereby controllably adjusting the peak amplitude of the electrical signal, and terminating the step of directing a laser beam when it has been determined in said step of comparing that the peak amplitude of the electrical signal is substantially equal to the prescribed level.

2. A method of making an optical shaft encoder of a type the produces an electrical output signal having a phase angle representative of the relative position of a movable shaft, said encoder including a source of light, first and second photocells positioned to receive the light, means coupled to the movable shaft for blocking transmission of the light to the two photocells in an alternating fashion in accordance with the relative position of the shaft, and differential amplifier means coupled to the photocells for subtracting the electrical signal produced by one photocell from the electrical signal produced by the other photocell, to produce the electrical output signal, said amplifier means including variable resistance means for use in controllably adjusting the peak amplitude of the electrical signal produced by each photocell, said method comprising the steps of:

mounting said first and second photocells and said amplifier means on a circuit board, energizing said source of light and said amplifier means and moving said movable shaft in prescribed fashion, monitoring the peak amplitude of the electrical signal produced by said first photocell, and comparing it to a prescribed level, directing a laser beam onto the variable resistance means in said amplifier means, while continuing to monitor the peak amplitude of the electrical signal produced by said first photocell, said laser beam having an intensity sufficient to alter the resistance of the variable resistance means, thereby controllably adjusting the peak amplitude of the electrical signal, terminating the step of directing a laser beam when it has been determined in said step of comparing that the peak amplitude of the electrical signal produced by said first photocell is substantially equal to the prescribed level, and repeating the steps of monitoring, directing, and terminating for the electrical signal produced by said second photocell, whereby the peak amplitudes of the electrical signals produced by said first and second photocells are both controllably adjusted to the prescribed level, and the resultant output signal has a phase angle that varies in a prescribed fashion in accordance with the relative position of the movable shaft.

3. In an optical encoder of the type having an encoder disc attachable to a shaft for rotation therewith, and having a light source and photosensor means disposed in a housing on opposite sides of said disc for sensing indicia on said disc to provide signals indicative of angular position of said disc and shaft, the improvement wherein:

said housing has two side members each with supporting ribs, each side member being attachable to the other to establish a unitary housing structure, said improvement further comprising:

means within said unitary housing structure for defining an internal circular chamber of diameter slightly larger than that of said disc, said internal chamber containing said disc, a hub on said disc, said hub extending axially thereof and including a bushing for receiving said shaft, a central circular coaxial opening in each of said housing side members, each opening being larger than said hub, said hub extending through one of said openings, said one opening and said chamber together permitting limited radial offset of said disc and hub to accommodate concomitant limited radial offset of said shaft with respect to said encoder housing, there being no journal attachment between said housing and any of said hub, shaft and disc, alignment boss members, extending between said side members, for providing alignment of said side members including said chamber delivery means so as to align said internal chamber when said side members are attached, and a metallic mask configured for aligned attachment to one of said side members covering said photosensor means, said light source being a single light emitting diode, the other of said side members including a boss extending outwardly of said housing structure, said light emitting diode being situated in an opening which extends through said outwardly extending boss to said internal chamber.

4. The improvement of claim 3 further comprising:

a printed circuit board on the exterior of said one side member, said circuit board including a central opening aligned with the opening in said one side member, said photosensor means comprising a plurality of photovoltaic cells formed in a common semiconductor chip, said chip being mounted behind said metallic mask in said one side member, said circuit board including amplifier circuitry mounted on said board immediately behind said photosensor means, said circuit board also supporting a set of laser trimmable resistors, said resistors being electrically connected to said amplifier circuitry and being mounted on said board facing outwardly of said unitary housing structure to facilitate laser trimming thereof during operation of said encoder.

5. The improvement of claim 4 further comprising: externally extending wire guide projections extending from said other side member, wires from said printed circuit board being guided by said projections to keep said wires from physical contact with said shaft.

* * * * *